F. W. ADSIT.
BANKING PLANE FOR AUTOMOBILES.
APPLICATION FILED SEPT. 17, 1915.
1,266,191.
Patented May 14, 1918.
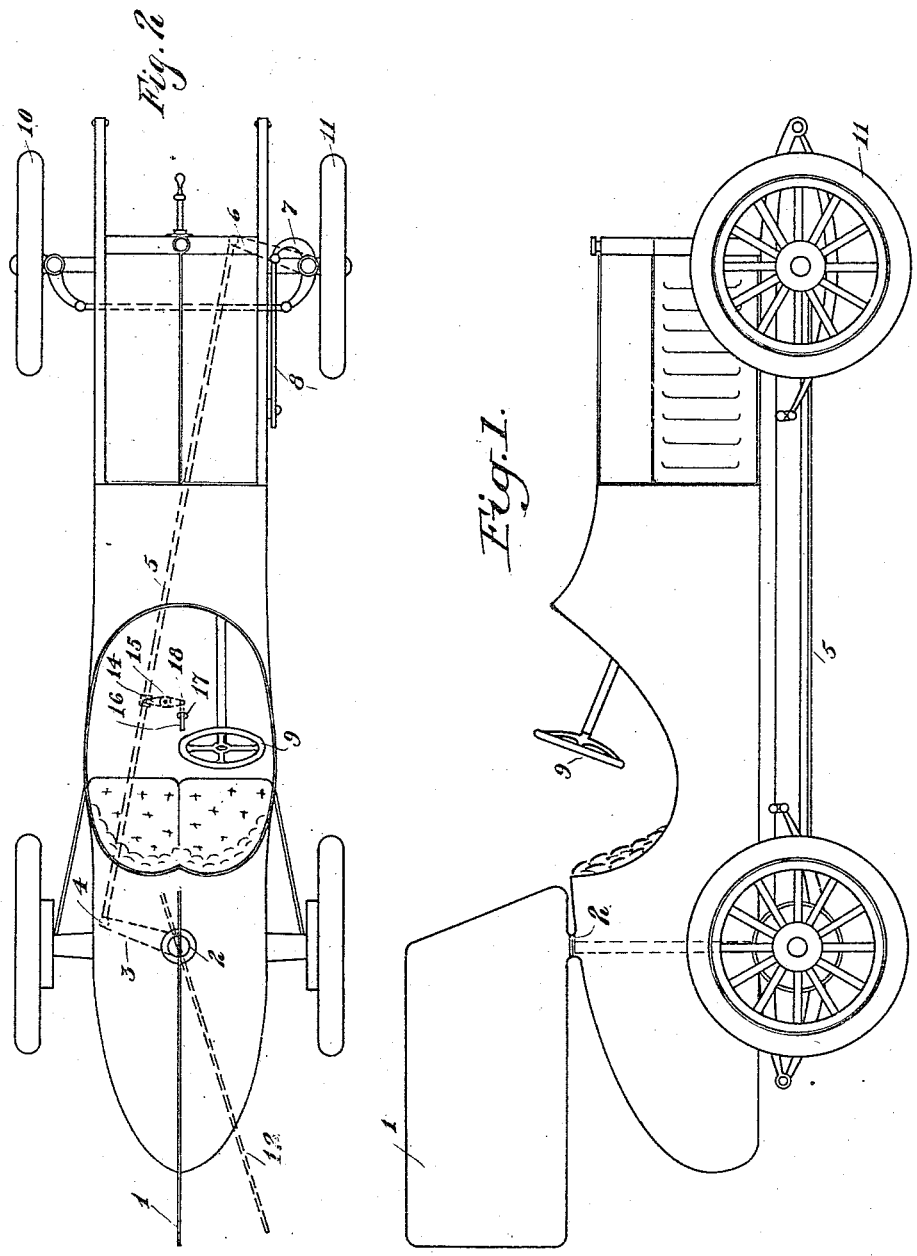
Inventor:
Frank W. Adsit.
by C. D. Enochs
Attorney.

UNITED STATES PATENT OFFICE.

FRANK W. ADSIT, OF MINNEAPOLIS, MINNESOTA.

BANKING-PLANE FOR AUTOMOBILES.

1,266,191. Specification of Letters Patent. Patented May 14, 1918.

Application filed September 17, 1915. Serial No. 51,289.

*To all whom it may concern:*

Be it known that I, FRANK W. ADSIT, a citizen of the United States, residing at Minneapolis, county of Hennepin, State of Minnesota, have invented new and useful Improvements in Banking-Planes for Automobiles, of which the following is a specification.

My invention relates to banking planes to be attached to automobiles, and particularly those of the racing type, and when so attached assists materially in preventing the car from skidding in going around a sharp curve.

The object of my invention is to provide a plane that may be attached to any type of moving vehicle, and movable either automatically or manually from its normal position parallel to the normal direction of the car or vehicle.

Figure 1 of the drawing which forms a part of this specification shows one method of attaching the banking plane 1 to the racing car 2, and Fig. 2 is a diagrammatic representation of one method of controlling the position of the plane 1 with respect to the car.

As shown in Fig. 2 the plane 1 is carried on a strong support 2 journaled to the body of the car in any suitable manner and having a lever 3 extending from the support and pivotally connected at 4 to the rod 5 extending forward to the lever 6, which is rigidly attached or a part of the steering knuckle 7, which is of any suitable type and is connected in the usual manner to the steering rod 8, which is under control of the steering wheel 9 through any suitable means (not shown).

When the steering wheel 9 is turned so as to move the steering wheel 10 and 11 in such a manner so as to direct the car to the left it is evident the banking plane 1 will be moved to the position indicated by the lines 12, and if the car was moved forward with the plane so deflected there would be a pressure exerted on the front portion of the plane 1 which would tend to prevent the rear wheel of the car swinging around the steering wheels as is now the usual result if a turn is made too quickly on an unbanked or insufficiently banked track. The rod 5 may be disconnected at 6 and the control of the plane effected manually through the operation of the lever 14 pivoted at 15 and controlled by the hand lever 16 pivoted at 17, whose lower end 18 is forked to receive the free end of the lever 14.

Much difficulty is experienced, especially with racing cars, and particularly on flat dirt tracks, in making turns at a high rate of speed, and I believe I am the first to devise a suitable method of preventing the car from skidding under these conditions The plane 1 may be made of cloth, wood, steel, or any other suitable material, and size and shape may be varied to suit the car to which it is to be applied, but I prefer to have a part of the plane in front and a part behind the support so as to avoid an extreme twisting strain on the support itself.

While I have described my invention and illustrated it as applied in one particular manner to an automobile, it is evident it may be embodied in various forms and applied in various manners, and I do not wish it understood that I confine myself to the particular arrangement of parts as shown herewith, but claim the invention broadly within the scope of the following claims.

Claims:

1. In banking planes for automobiles having a steering wheel and steering means controlling said wheel, the combination with the automobile of a vertically positioned plane hinged to said automobile and spaced from the steering wheel thereof, and means controlled by said steering means for turning said banking plane horizontally in a direction the reverse to that which said steering means turns said steering wheels.

2. In banking planes for automobiles the combination of a banking plane hinged thereon, and means connecting said banking plane with the steering mechanism of an automobile for turning said banking plane in a reverse direction from that which said steering mechanism turns the steering wheels of said automobile.

3. In banking planes for automobiles having a steering wheel near one end of said automobile, of a banking vertical plane hinged near the other end of said automobile, and means controlled by the steering mechanism of the automobile for turning said banking plane and said steering wheel in opposite directions.

FRANK W. ADSIT.

Copies of this patent may be obtained for five cents each, by addressing the "Commissioner of Patents, Washington, D. C."